United States Patent Office 3,281,494
Patented Oct. 25, 1966

3,281,494
PROCESS FOR CURING EPOXY RESINS WITH RESINS DERIVED FROM 1,3 - DI - (1' - OXY-ARYL-CARBINOL)-2-PROPANOL
Pierre Castan and Claude Gandillon, Geneva, Switzerland, assignors to Stella S.A., Geneva, Switzerland, a corporation of Switzerland
No Drawing. Filed May 20, 1963, Ser. No. 281,770
Claims priority, application Switzerland, May 25, 1962, 6,347/62
6 Claims. (Cl. 260—832)

The present invention has for an object a process for the preparation of heat-hardening synthetic resins which comprises the condensation of epoxidic resins with derived from 1,3 - di-(1' - oxyaryl-carbinol)-2-propanol obtained by condensation of methylolated phenols with epichlorohydrin in an alkaline medium, and the resins produced by the process.

The invention has also for an object the utilization of heat-hardening synthetic resins obtained according to this process for the preparation of pigmented or non-pigmented varnishes.

It is known that epoxidic resins of the conventional type obtained by condensation of epichlorohydrin with diphenols or aliphatic polyalcohols cannot be hardened by the action of heat alone, but that it is necessary to call upon another compound capable of reacting with the epoxide groups.

These compounds are numerous and belong to very different chemical classes as for example organic polybasic acids and their anhydrides, aliphatic or aromatic primary or secondary polyamines, compounds containing the sulphydrile group, etc.

Apart from these relatively simple compounds one can also cite various condensation products such as phenol-formaldehyde resins, urea-formaldehyde, melamine-formaldehyde, etc.

In these latter cases the reaction occurs between the epoxide groups of the epoxidic resin and the methylol groups of the condensation products. These methylol groups are bound to aromatic rings (in the case of phenol-formaldehyde resins) or to amino groups (in the case of urea-formaldehyde resins, melamine - formaldehyde, etc.). The methylol groups are characterized by their strong reactivity due to the presence of the phenolic hydroxyl situated in ortho or para position, or again to their fixation on a nitrogen atom.

This reaction is much more difficult to produce with normal aliphatic alcoholic groups, for example with aliphatic polyalcohols. In such cases one must in fact utilize very active catalysers such as boron fluoride or sodium hydroxide which are themselves hardening agents for the epoxidic resins, (see Paquin: Epoxydverbindungen und Epoxydharze, pages 485–486, Springer 1958).

As regards aromatic alcohols no example of their utilization is available, because in order to obtain a hardening of epoxidic resins polyalcohols must be used and aromatic polyalcohols are rare and technically difficult to prepare.

It has been found that epoxidic resins of the conventional type obtained by condensation of epichlorohydrin with diphenols or aliphatic polyalcohols may be hardened by making them react on resins derived from 1,3-di-(1'-oxyaryl - carbinol) - 2 - propanol obtained by condensation of methylolated phenols and epichlorohydrin in an alkaline medium. These resins are very easy to obtain by condensation of the epichlorohydrin with dimethylolated phenols, especially phenols substituted in para position by hydrocarbon radicals. One thus obtains by-products of etherified glycerine through by-products of oxybenzyl-alcohol. For example with 4-tert-butyl-2,6-dimethylolphenol, a compound having the following formula:

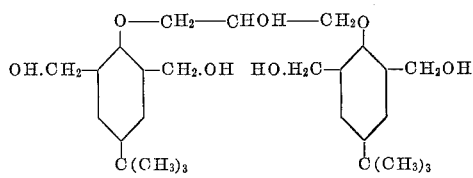

As a result of this reaction the phenolic hydroxyl of the oxybenzylic alcohol has disappeared and the initial methylol groups have lost their special character of strong reactivity and must now be considered as groups of substituted benzylic alcohol, of a kind similar to anisic alcohol for example.

As a general rule the reaction between the epichlorohydrin and the by-products of oxybenzylalcohol gives resins containing besides the simple compound, the formula of which is reproduced above, condensation products due to an etherification between the alcohol groups. This is shown by the hydroxyl number which is about 500, whereas it is 590 for the simple compound, having non etherified alcohol groups. The latter may moreover be obtained in the pure state by crystallization and it has a melting point of 170° C., whereas the resin softens at a temperature of about 70° C. This resin, called hereafter "glycero-benzylic resin", is very stable to heat and easily stands for example heating for 6 to 10 hours at 200° C. without hardening.

By mixing this glycero-benzylic resin with an epoxidic resin in such proportions that a three dimensional network may be formed, the hardening of the mixture is obtained in a few hours by heating from 200 to 300° C. The final product is hard, has a certain elasticity and has good resistance to powerful solvents, such as methylethyl-ketone.

The use of catalysers permits of reducing appreciably the duration of the reaction which may then take place in about ten minutes at temperatures of the order of 150 to 300° C. The use of these catalysers also permits of obtaining very slightly coloured layers, as compared with what is observed when one utilizes phenolic resins in order to cause the hardening of the epoxidic resins. As acid catalysers one may cite phosphoric acid, butylphosphoric acid, toluene-sulphonic acid, etc. Caustic soda, sodium phenate, etc. possess an activating action.

The proportions of the mixture of the glycero-benzylic resins with the epoxidic resins vary obviously with the kind of resin employed and the properties of the product which it is desired to obtain. Thus with a glycero-benzylic resin prepared from butylphenol and conventional epoxidic resin obtained from bisphenol and epichlorohydrin, the proportions may vary between 10 parts of glycero-benzylic resin for 90 parts of epoxidic resin containing 0.54 mole of epoxide for 1000 g. of resin and 50:50 of each resin.

In general the compatibility between the two series of resins is total, which permits of obtaining clear solutions the use of which as a varnish is very interesting as a result of the properties of the layers obtained after heating.

To this end, one dissolves the resins in a mixture of suitable solvents, mixtures of which will generally contain alcohols, ketones and hydrocarbons. All or a part of the alcohols may be replaced by ether-alcohols of the ethylglycol type. Ethers may replace the ketones. To this solution is added the catalyser or catalysers which must be soluble in this solution. The quantity of catalyser relative to the total of the resins varies generally between 0.05% and 5%, this according to the kind of catalyser employed and the desired final effect.

Through evaporation of the solvents one obtains transparent layers, only slightly coloured, which harden rapidly upon heating at a temperature of from 150 to 200° C. After heating these layers undergo practically no change of tint. They adhere very strongly to metals, in particular tin-plated or non tin-plated iron, zinc, aluminium and its alloys, etc.

The application of these varnishes may be carried out by immersion, by brushing, by spraying with a spray-gun and other known application means.

After heating, the varnishes produce very flexible layers and have a strong chemical resistance. This renders their utilization interesting for the inner protection varnishes for metallic packing-cases, especially aluminium flexible tubes which are at present employed on a very large scale for the packing of very different products. The resistance of the layers is excellent in connection with acid and alkaline agents, detergents and wetting agents as well as the most powerful solvents such as ketones, esters, chlorated hydrocarbons, etc. They also have very good resistance to complex mixtures such as cosmetic or food products; in the latter case their harmlessness renders them interesting.

It is possible to colour the varnish layers with different products, which permits an easier control of the applications after heating, in particular as regards the thickness and the continuity of the layer.

At present, one very often employs varnishes based on epoxidic resins and phenolic resins for the varnishing of aluminium tubes. However, in the latter case, the phenolic hydroxyls do not appear to take part in the reaction, so that the layers produced still offer weak points due to the phenolic hydroxyl groups still present. Since glycero-benzylic resin does not contain any phenolic group, the resistance of the films is much higher than that of films produced with the conventional phenolic resins.

It must be mentioned that it is also possible to produce with these new resins oven-hardened pigmented varnishes having the same characteristics as the colourless coatings.

The new heat-hardening resins will be utilized for the manufacture of pigmented and non-pigmented varnishes.

EXAMPLE 1

In a three-necked balloon flask one dissolves while heating at a temperature of about 70 to 80° C. and while stirring, 150 g. of tert-butyphenol in 200 g. of caustic soda at 20%. When the mixture has become limpid it is cooled to about 50 to 60° C. and one adds thereto 170 ml. of formaldehyde of 40% volume. One allows the mixture to react under a reflux condenser for two hours at this same temperature. One finally adds thereto over a period of half an hour 74 g. of epichlorohydrin and maintains the temperature for a further three hours between 50 and 60° C. The resin produced is washed with water having a temperature of 40 to 50° C. in order to eliminate the salt which has formed, and then one dries the resin in vacuum at a temperature of 150 to 170° C.

One obtains a fusible pale yellow resin having the following properties:

Melting point, 60 to 70° C.
Hydroxyl number, 500.

One prepares, on the one hand, a 40% solution of this glycero-benzylic resin in ethylglycol by dissolving 97 g. of glycero-benzylic resin in
145 g. of ethylglycol
——
242 g. of solution and, on the other hand, a solution of epoxidic resin containing 0.54 mole of epoxide for 1000 g. of resin, at a concentration of 34% by dissolving:

230 g. of epoxidic resin in
140 g. of methylisobutylketone and
140 g. of diacetone-alcohol
160 g. of solution
——
670 g. of solution One mixes these two solutions and obtains a mixture which contains the two resins, the epoxidic resin and the glycero-benzylic resin in the proportion of 70:30 respectively, one then adds 13 g. of a 25% solution of phosphoric acid in the butanol and one obtains a limpid varnish. The finished mixture may be brought to a viscosity of 20–25 sec. at Ford Becher 4, by adding 70–80 g. of a mixture of methylisobutylketone, diacetone-alcohol and toluene in equal parts.

Through immersion of aluminum sheets in this varnish and heating for a period of 40 to 60 minutes at a temperature of about 240 to 260° C. one produces a very supple, nearly colourless coating, which recovers from bending and is thus very flexible. It is not attacked by methylethylketone.

EXAMPLE 2

One prepares, on the one hand, a 40% solution of glycero-benzylic resin according to Example 1 in ethylglycol:

97 g. of glycero-benzylic resin in
145 g. of ethylglycol
——
242 g. of solution and, on the other hand, a solution of epoxide resin containing 0.54 mole of epoxide for 1000 g. of resin, at a concentration of 34%:

291 g. of epoxidic resin
188 g. of methylisobutylketone
188 g. of diacetone-alcohol and
188 g. of toluene
——
855 g. of solution One mixes these two solutions and one obtains a mixture which contains the two resins, the epoxidic resin and the glycero-benzylic resin in the proportion of 75:25 respectively and one obtains a limpid varnish.

Through immersion of sheets of aluminum in this varnish and heating for 2 to 3 hours at a temperature of about 240 to 260° C. one obtains a flexible brownish coating, which recovers from bending and is elastic. This coating is not attacked by methylethylketone.

EXAMPLE 3

One prepares the two same solutions of glycero-benzylic resin and epoxidic resin as described in Example 1. The mixture of these two solutions contains the epoxidic resin and the glycero-benzylic resin in the proportion of 70:30 respectively. One adds to this mixture 8 g. of a 20% aqueous solution of caustic soda and obtains a limpid varnish.

Through immersion of aluminum sheets in this varnish, one obtains a flexible light brown coating, which recovers from bending and which is not attacked by methylethylketone after heating during one hour at 240° C.

EXAMPLE 4

One melts at a temperature of about 120° C. while stirring, a mixture of 700 g. of epoxidic resin containing 0.54 mole of epoxide for 1000 g. of resin and of 300 g. of glycero-benzylic resin prepared according to Example 1 and obtains a hard and limpid mass.

Through heating in an oven at a temperature of about 200 to 400° C. for 3 to 4 hours one obtains a very hard compound, non-fusible and insoluble in solvents.

We claim:

1. A process for curing epoxidic resins characterized by

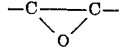

groups, comprising adding to said resins a composition consisting essentially of glycerobenzylic resins derived from 1,3-di-(1′oxyaryl-carbinol)-2-propanol obtained by condensation of methylolated phenols with epichlorohydrin in an alkaline medium.

2. A process according to claim 1 in which said curing of epoxidic resins is carried out in the presence of solvents.

3. A process according to claim 2 in which said curing is carried out in the presence of acid catalysers.

4. A process according to claim 2 in which said curing is carried out in the presence of alkaline catalysers.

5. A process according to claim 1 in which said curing is carried out between said epoxidic resins and the resins derived from the 1,3-di-(1′oxyaryl-carbinol)-2-propanol in the proportion of 90 to 50 parts of epoxidic resins for 10 to 50 parts respectively of resins derived from 1,3-di-(1′-oxyaryl-carbinol)-2-propanol.

6. A process as claimed in claim 1, said glycero-benzylic resins being substantially free from

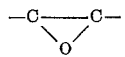

groups.

References Cited by the Examiner

UNITED STATES PATENTS 2,659,710  11/1953  Martin _____ 260—831
2,730,467  1/1956  Daszewski _____ 260—834

MURRAY TILLMAN, *Examiner.*

J. C. BLEUTGE, *Assistant Examiner.*